(12) United States Patent
Kimura

(10) Patent No.: US 6,211,797 B1
(45) Date of Patent: Apr. 3, 2001

(54) INFRARED COMMUNICATION CONTROL APPARATUS AND METHOD

(75) Inventor: Mitsuhide Kimura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/129,204

(22) Filed: Jul. 29, 1998

(30) Foreign Application Priority Data

Jul. 29, 1997 (JP) .................................................... 9-203480

(51) Int. Cl.[7] .................................................. G08C 19/00
(52) U.S. Cl. .............................. 340/825.72; 340/825.69; 340/825.06; 359/152; 359/153; 359/155; 709/228
(58) Field of Search .................... 340/825.92, 825.69, 340/825.06, 826, 825.03, 825.01; 370/351, 447; 375/220; 359/152, 153, 155; 709/228

(56) References Cited

U.S. PATENT DOCUMENTS 5,247,380 * 9/1993 Lee et al. ............................ 359/118
5,557,634   9/1996 Balasubramanian et al. .

FOREIGN PATENT DOCUMENTS 8-195785  9/1998 (JP) .

* cited by examiner

Primary Examiner—Brian Zimmerman
Assistant Examiner—Yves Dalencourt
(74) Attorney, Agent, or Firm—Dike, Bronstein, Roberts & Cushman, LLP; David G. Conlin; David A. Tucker

(57) ABSTRACT

An object of the invention is to make it possible to switch a plurality of infrared communication schemes without depending on an automatic detection of infrared signals. A plurality of communication ports are related to a plurality of infrared communication schemes, respectively. When the communication port is opened, a communication port controller refers to a relating information table of a memory to send relating information to an infrared protocol selector and an infrared modulation/demodulation scheme selector. An IrDA infrared protocol generator, an ASK infrared protocol generator or a consumer IR infrared protocol generator is selected, and then an IrDA modem, an ASK modem or a consumer IR modem is selected. Data communication of infrared signals is conducted through an infrared unit in accordance with the protocol and the modulation/demodulation scheme thus selected.

17 Claims, 10 Drawing Sheets

FIG. 2

| COMMUNICATION PORT | INFRARED SCHEME | INFRARED PROTOCOL | INFRARED MODULATION/ DEMODULATION SCHEME | PRIORITY ORDER |
|---|---|---|---|---|
| A | IrDA | FILE INFORMATION, ETC. | FILE INFORMATION, ETC. | LOW |
| B | ASK | FILE INFORMATION, ETC. | FILE INFORMATION, ETC. | HIGH |
| C | CONSUMER IR | FILE INFORMATION, ETC. | FILE INFORMATION, ETC. | LOW |
| D | ........ | ........ | ........ | |
| ........ | ........ | ........ | ........ | |

31 32 33 34 35

INFRARED COMMUNICATION CONTROL APPARATUS AND METHOD

BACKGROUND OF THE INVENTION

1. Field of the Invention

The present invention relates to an infrared communication control apparatus and method for handling a plurality of infrared communication schemes at the same time, in the case of data communication using infrared signals.

2. Description of the Related Art

Japanese Unexamined Patent Publication JP-A 8-195785 (1996), for example, discloses an infrared communication control apparatus for infrared communication systems having a plurality of infrared modulation/demodulation schemes, the infrared communication control apparatus being capable of generating a proper type of infrared signal by automatically judging what type of infrared signal is actually received. The configuration of this prior art control apparatus is shown in FIG. 10 in a simplified fashion. An application program conducts data communication through a communication port controller 1. The data input to the communication port controller 1 is modulated into infrared signals by an infrared modem 2 or received infrared signals are demodulated into data by the infrared modem, and then they are given to the application program through the communication port controller 1. The type of the received infrared signals is automatically detected by an infrared modulation/demodulation scheme automatic detector 3. Reception and transmission of the infrared signals are carried out by an infrared unit 4. The infrared modem 2 and the infrared modem modulation/demodulation automatic detector 3 are included in an infrared controller 5 for controlling the infrared unit 4. The infrared unit 4 includes a light-emitting diode for generating an infrared ray and a photo-diode or photo-transistor for receiving light.

Conventionally, an application program is required to switch an infrared modulation/demodulation scheme to an infrared modulation/demodulation scheme employed by the other party before conducting data communication by infrared rays. The user of an infrared communication control apparatus, therefore, is required to recognize the infrared modulation/demodulation scheme employed by the unit of the other party beforehand. In the prior art disclosed in JP-A 8-195785, the infrared signals received from the other party are detected by using the infrared modulation/demodulation scheme automatic detector 3 and the type of the infrared signals is classified, so that the infrared modulation/demodulation scheme is automatically detected. The application program, therefore, can conduct data communication through a communication port regardless of the infrared modulation/demodulation scheme of the other party or a protocol of the infrared signals.

An infrared communication scheme used for a remote controller of a domestic electric appliance such as a TV set can be cited as one of the most successful examples. As a personal computer has become widespread, an infrared modulation/demodulation scheme based on digital communication by a computer system has also come to be employed recently. An example of the infrared modulation/demodulation scheme using digital data as a medium for digital communication is an ASK scheme proposed by Sharp Kabushiki Kaisha. The ASK (amplitude shift keying) scheme is used for transmitting personal information registered in an electronic notebook or the like, to a personal computer. An IrDA scheme defined by an IrDA (Infrared Data Association) Committee established to support the infrared communication between products of different manufacturers is another example. Still another infrared communication scheme defined by the IrDA Committee is a consumer IR scheme for an intelligent remote controller of interactive type intended for domestic use. As described above, various infrared modulation/demodulation schemes are currently used. An application program, therefore, is required to switch an infrared modulation/demodulation scheme to an infrared modulation/demodulation scheme employed by a communication unit of the other party before conducting data communication using an infrared unit. As a result, the user is required to consider the infrared modulation/demodulation scheme of the communication unit of the other party, and unless an infrared modulation/demodulation scheme employed by the user suits that of the communication unit of the other party, the user is unable to conduct data communication. Furthermore, various arrangements for data communication constituting communication rules exist as a unique communication protocol for each infrared modulation/demodulation scheme. It is therefore necessary to switch the communication protocol as well as the infrared modulation/demodulation scheme.

In the prior art disclosed in JP-A 8-195785, the infrared modulation/demodulation scheme can be automatically detected only after the infrared signals are received from the infrared communication unit of the other party. In the case of communication with a passive infrared communication unit which begins transmission only after receiving infrared signals from an infrared unit of the other party, the infrared communication scheme may not be determined automatically. Many of the existing infrared peripheral units employ such a passive scheme. Even a computer system having a function of automatically detecting the infrared communication scheme is required to transmit ahead an infrared signal when transmitting data to an infrared peripheral unit performing passive infrared communication. In addition, it is difficult to switch a control conforming to each infrared communication scheme. The result is so contradictory that even in a case where a plurality of infrared communication schemes can be switched over, the infrared communication scheme to be used for first transmission cannot be determined. Consequently, the prior art disclosed in JP-A 8-195785 cannot realize smooth data communication with the passive infrared communication unit often used in the existing infrared peripheral units.

SUMMARY OF THE INVENTION

An object of the present invention is to provide an infrared communication control apparatus and a control method for easily conducting infrared communication by establishing the type of an infrared communication scheme before transmitting/receiving data without depending on an automatic detection of the infrared communication scheme of infrared signals sent from the other party of communication.

In a first aspect of the invention, an infrared communication control apparatus comprises:

a plurality of communication ports respectively related to a plurality of infrared communication schemes;

selecting means for selecting, when one of the plurality of communication ports is opened, a protocol and a modulation/demodulation scheme of the infrared communication scheme related to the one communication port to be opened;

protocol generating means for generating data conforming to a protocol selected by the selecting means; and infrared modulation/demodulation means for modulating the data generated by the protocol generating means in accordance with the modulation/demodulation scheme selected by the selecting means to generate and transmit infrared signals, and for demodulating received infrared signals into data.

According to the first aspect of the invention, in the plurality of communication ports, a plurality of communication ports respectively related to a plurality of infrared communication schemes can be added to a standard communication port. Each of the additional communication ports can be related to one specific infrared modulation/demodulation scheme and an infrared communication protocol related to the specific infrared modulation/demodulation scheme. In a case where the application program conducts data communication through the additional communication port, an infrared modulation/demodulation scheme and an infrared communication protocol which are related to the communication port is automatically selected by the selecting means, data conforming to the selected protocol is generated by the protocol generating means, and the data thus generated is modulated by the infrared modem in accordance with the modulation/demodulation scheme selected by the selecting means to be transmitted. The received infrared signals are demodulated into data by the infrared modem The application program can easily conduct data communication without additional data processing or control of an infrared unit depending on each of the infrared communication schemes, simply by opening a communication port related to a specific infrared modulation/demodulation scheme.

As described above, according to the invention, instead of automatically detecting an infrared modulation/demodulation scheme, an infrared modulation/demodulation scheme and a protocol are related to a multi-purpose communication port. Therefore, the application program can select an infrared modulation/demodulation scheme without bothering the user about the complexity thereof. An infrared communication unit having a multi-purpose communication port utilizing the existing infrared controller can select an infrared communication scheme and conduct infrared communication without any extra hardware for signal level evaluation. Also, even when a new infrared communication specification is laid down, the user can conduct infrared communication in the same manner as the case of the existing infrared communication scheme simply by assigning a new communication port to the specification to select the communication port.

In a second aspect of the invention, the infrared communication control apparatus is characterized in that among the communication ports is included a communication port having an interface for mutual communication of multi-purpose data between a computer system and a peripheral unit or between computer systems, the communication port emulating a serial interface for continuously transmitting/receiving data.

According to the second aspect of the invention, by accessing a communication port in the same manner as the case of mutually communicating multi-purpose data between a computer system and a peripheral unit or between computer systems, the application program can emulate a serial interface and transmit/receive serial data based on the infrared communication scheme related to the communication port.

As described above, according to this invention, the application program can conduct infrared communication conforming to an infrared communication scheme related to a communication port simply by transmitting/receiving data to and from the communication port in such a manner as serial communication.

In a third aspect of the invention, the infrared communication control apparatus is characterized in that among the communication ports is included a communication port having an interface for mutually communicating multi-purpose data between a computer system and a peripheral unit or between computer systems, the communication port emulating a parallel interface for continuously transmitting/receiving data.

According to the third aspect of the invention, the application program accesses a specific communication port to emulate a parallel interface by using an infrared communication scheme related to the communication port and to conduct infrared communication in the same manner as the case of outputting data to a printer or the like.

As described above, according to the invention, the application program can designate and handle a communication port as a parallel interface to conduct infrared communication in the same manner as the case of outputting data to a printer or the like.

In a fourth aspect of the invention, the infrared communication control apparatus further comprises storing means for storing a relation between the infrared communication scheme and the communication port in an information table.

According to the fourth aspect of the invention, an information table for relating the infrared communication scheme to the communication port is held in the storing means, so that an infrared communication scheme can be easily selected when a communication port is opened.

As described above, according to the invention, the information table for relating the infrared communication scheme to the communication port is held in the storing means, so that the protocol or the infrared modulation/demodulation scheme for infrared communication can be easily altered, and a new infrared communication specification can be easily added.

In a fifth aspect of the invention, the infrared communication control apparatus is characterized in that among the infrared communication schemes is included an IrDA scheme.

According to the fifth aspect of the invention, since the infrared communication schemes include an IrDA scheme, an infrared modulation/demodulation scheme as well as an infrared communication protocol are conformed to various infrared communication units to conduct data communication.

Also, according to the invention, the infrared communication according to the IrDA scheme can be easily conducted.

In a sixth aspect of the invention, the infrared communication control apparatus is characterized in that in the infrared communication schemes is include an ASK scheme.

According to the sixth aspect of the invention, the infrared communication schemes include an ASK scheme, so that it is possible to facilitate data communication with an electronic notebook, a portable information equipment and so on which find wide applications.

As described above, according to the invention, the infrared communication according to the ASK scheme can be easily conducted.

In a seventh aspect of the invention, the infrared communication control apparatus is characterized in that among the infrared communication schemes is include a consumer IR scheme.

According to the seventh aspect of the invention, since the infrared communication schemes include an consumer IR scheme, it is possible to easily conduct data communication with, for example, a remote controller for domestic electric appliances.

As described above, according to the invention, the infrared communication based on the consumer IR scheme can be easily conducted.

In an eighth aspect of the invention, the infrared communication control apparatus further comprises echo canceling means for canceling received data after data is transmitted from the infrared modulation/demodulation means.

According to the eighth aspect of the invention, received data is canceled for a predetermined time length after data transmission, so that an echo generated in the infrared modem is canceled by the echo canceling means. A function of echo cancellation by the echo canceling means omits the need to consider the echo of the infrared signals in the application program, and therefore data can be transmitted in the same manner as a multi-purpose communication port or a printer output port.

As described above, according to the invention, in view of the fact that the echo canceling means cancels the received data for a predetermined length of time after transmission of data from the infrared modem, the transmitted data and the received data can be positively discriminated from each other. In full-duplex communication, the echo canceling process is indispensable. The application program can conduct full-duplex communication regardless of the echo characteristic which is unique to infrared rays.

In a ninth aspect of the invention, the infrared communication control apparatus further comprises priority processing means for controlling the selecting means so as to select one communication port in accordance with a predetermined order of priority when the plurality of communication ports are opened at the same time.

According to the ninth aspect of the invention, even when a plurality of communication ports are opened at the same time, one of them is selected in accordance with a predetermined order of priority to select an infrared communication scheme related to the communication port. For example, the IrDA scheme, which is required to find a candidate infrared communication unit of the other party, is always provided with a lower priority so as to permit switching to another scheme whenever required.

As described above, according to this invention, a plurality of communication ports which are independent for each infrared scheme can be operated for an infrared controller capable of supporting a plurality of infrared communication schemes, and therefore an infrared communication scheme can be selected in accordance with a predetermined order of priority.

In a tenth aspect of the invention, a method for controlling an infrared communication, comprising the steps of:

relating a plurality of infrared communication schemes to a plurality of communication ports in advance, respectively, and accessing each of the communication ports to automatically select and switch a protocol and a modulation/demodulation scheme of an infrared communication scheme related to the communication port.

According to the tenth aspect of the invention, a plurality of infrared communication schemes are respectively related to a plurality of communication ports in advance. Therefore, simply by accessing each of the communication ports, a protocol and a modulation/demodulation scheme of an infrared communication scheme related to the communication port can be automatically selected and infrared data communication can be conducted in accordance with the infrared communication scheme thus selected. The user of the infrared communication unit can conduct the infrared communication according to a proper protocol and a proper modulation/demodulation scheme regardless of the protocol or the modulation/demodulation scheme for each infrared communication scheme.

As described above, according to this invention, the application program can easily conduct data communication without an additional data processing or control of the infrared unit depending on the infrared communication scheme, simply by accessing a communication port related to a specific infrared communication scheme. Also, since a plurality of infrared communication schemes are related to a plurality of communication ports, respectively, infrared communication adapted to the infrared communication scheme of the other party can be conducted simply by selecting an infrared communication port in accordance with the infrared communication scheme of the other party.

BRIEF DESCRIPTION OF THE DRAWINGS

Other and further objects, features, and advantages of the invention will be more explicit from the following detailed description taken with reference to the drawings wherein.

FIG. 2 is a diagram showing contents of a relating information table 24 of FIG. 1;

DETAILED DESCRIPTION OF THE PREFERRED EMBODIMENTS

Figure 1:
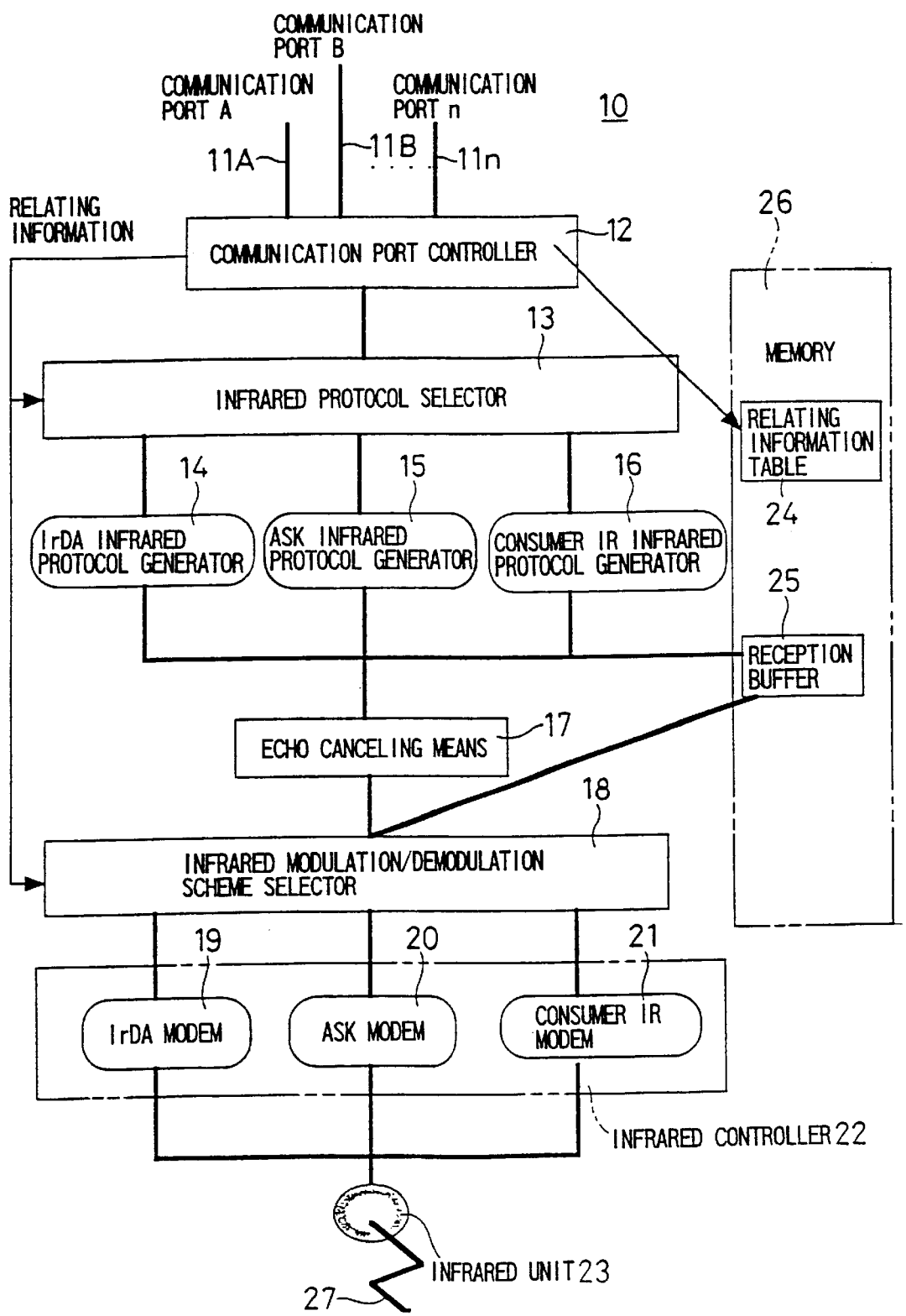
FIG. 1 is a block diagram schematically showing an electrical configuration according to an embodiment of the invention.

Now referring to the drawings, preferred embodiments of the invention are described below.

FIG. 1 shows an architecture of an infrared communication control apparatus 10 according to an embodiment of the present invention. This infrared communication control apparatus 10 can be built in a so-called notebook-sized personal computer, a portable terminal and the like. A plurality of communication ports 11A, 11B, . . . , and 11n are related to specific infrared communication schemes, respectively. The communication ports 11A, 11B, . . . , and 11n may be designated collectively by a reference numeral "11". When data is inputted to any one of the communication ports 11A, 11B, . . . , and 11n, a communication port controller 12 sends out relating information which is previously related to the communication port, to an infrared protocol selector 13. The infrared protocol selector 13 receives the relating information and selects a protocol generator designated by the relating information from among an IrDA infrared protocol generator 14, an ASK infrared protocol generator 15 and a consumer IR infrared protocol generator 16. The protocol-incorporated data generated by the selected protocol generator is given through an echo canceling means 17 to a modem selected by an infrared modulation/demodulation scheme selector 18. The Infrared modulation/demodulation scheme selector 18. In accordance with the relating information supplied from the communication port controller 12, selects any one of an IrDA modem 19, an ASK modem 20 and a consumer IR modem 21, and modulates the protocol-incorporated data supplied from the echo canceling means 17. The IrDA modem 19, the ASK modem 20 and the consumer IR modem 21 are included in an infrared controller 22. When a new infrared communication scheme is added, a software of the protocol generator is altered and the infrared controller 22 is added or replaced. The modem in the infrared controller 22 performs transmission/reception via an infrared unit 23.

In order that the communication port controller 12 acquires the relating information with respect to the communication ports 11, a relating information table 24 Is provided. The relating information table 24 is assigned to a specific area within a memory 26 together with a reception buffer 25. The reception buffer 25 receives received information supplied as infrared signals 27 from an external source through a photoreceptor of the infrared unit 23, the received information being temporally stored in the reception buffer 25 after demodulated by any one of the modems within the infrared controller 22 selected by the infrared modulation/demodulation scheme selector 18. The infrared signals 27 to be transmitted are also transmitted from a light-emitting section of the infrared unit 23 in accordance with a modulation output of each modem in the infrared controller 22.

Each of the plurality of communication ports 11 has an interface for a mutual communication of multi-purpose data between a computer system and a peripheral unit or between computer systems. The communication ports 11 include a communication port for emulating a serial interface for transmitting/receiving data continuously or a communication port for emulating a parallel interface for transmitting/receiving data continuously. The operating system in the personal computer defines communication ports for supporting a serial interface as physical communication ports called, for example, COM1, COM2, COM3 and COM4. Data communication can be conducted by connecting a serial communication cable to any one of these communication ports. The communication port controller 12 according to the embodiment further has a function of logically adding the communication port 11. For example, communication ports COM5, COM6 and COM7 are added and related to the IrDA scheme, the ASK scheme and the consumer IR scheme, respectively. The application program simply exchanges data conforming to such a specification as UART (Universal Asynchronous Receiver-Transmitter) through COM5, COM6 and COM7 to carry out a serial data communication based on an infrared communication scheme related to each of the communication ports 11.

The operating system of the personal computer also defines communication ports for supporting a parallel interface as physical input/output ports called, for example, LPT1, LPT2, LPT3 and LPT4. Data communication etc. can be conducted in the same fashion as the case of a printer conforming to the Centronics specification by connecting a cable for a parallel interface to these ports. In view of this, ports LPT5, LPT6 and LPT7 are added and related to the IrDA scheme, the ASK scheme and the consumer IR scheme, respectively. In this way, the application program simply exchanges data conforming to the Centronics specification through the communication ports of LPT5, LPT6 and LPT7 to conduct parallel data communication based on an infrared communication scheme related to each of the communication ports. Especially, a printer capable of performing infrared communication can print by radio through the communication port 11 for emulating a parallel interface.

FIG. 2 shows the contents of the relating information table 24 stored in the memory 26. By referring to communication port information 31 and infrared scheme information 32, it is possible to know a relation between a communication port 11 and an infrared communication scheme. Furthermore, by referring to infrared protocol information 33, infrared modulation/demodulation scheme information and priority order information 35, it is possible to know information on the infrared protocol, information on the infrared modulation/demodulation scheme and an order of priority of the communication port 11, respectively, relating to the infrared communication scheme selected by the communication port 11. The infrared protocol information 33 includes file information etc. of a program for generating a protocol, which facilitates the replacement of a program for generating an infrared protocol in the case of version-up. Also, the infrared modulation/demodulation scheme information 34 includes file information etc. of a program for modulating transmission data or demodulating the received data, which facilitates the replacement of a program for infrared modulation/demodulation in the case of version-up. The priority order information 35 includes information as to which communication port 11 can use the infrared unit 23 in priority when a plurality of communication ports 11 related to the infrared communication schemes, respectively, are opened at the same time.

Figure 3:
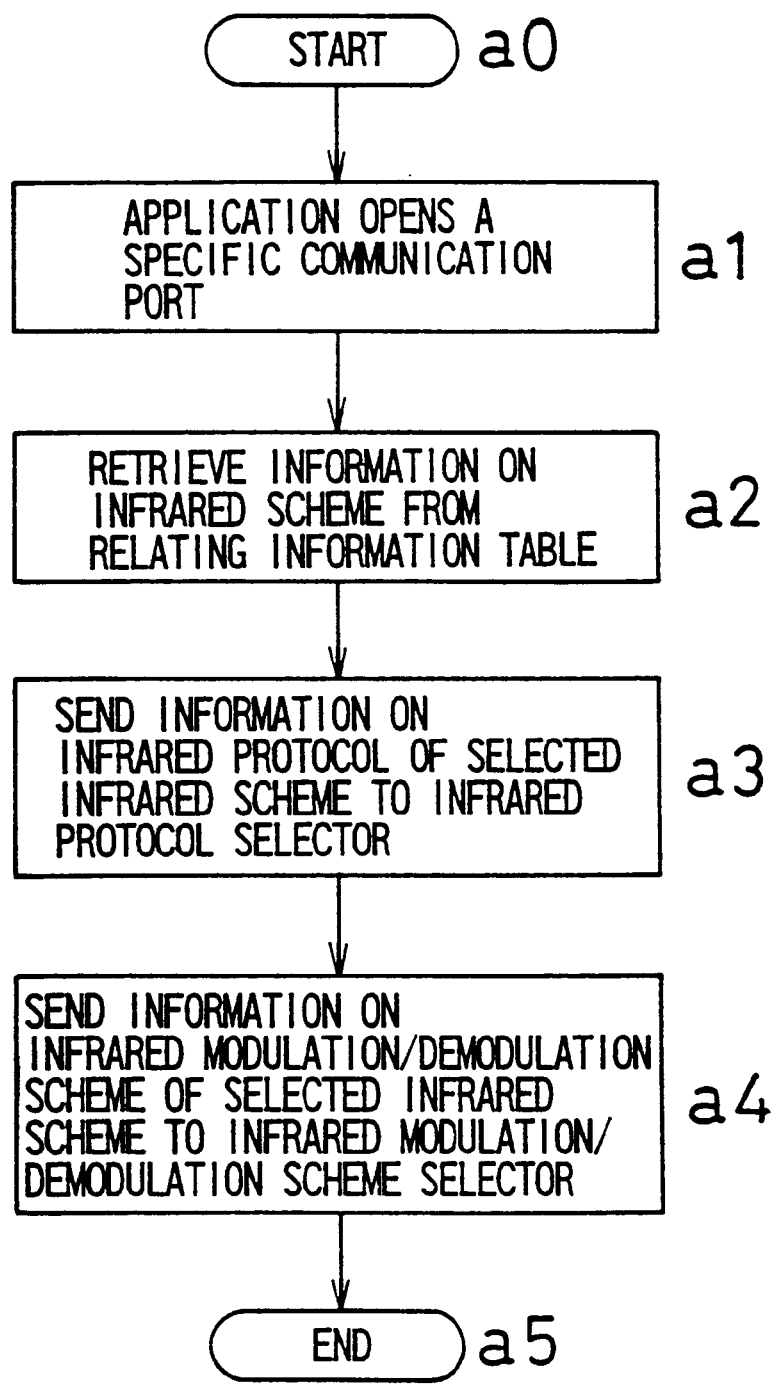
FIG. 3 is a flowchart showing the general operation of the infrared communication control apparatus 10 of FIG. 1.

FIG. 3 shows an operation using the relating information table 24 of FIG. 2. The operation starts with step a0. In step a1, the application program opens a communication port 11 related to the infrared communication scheme. When the application program opens one specific communication port 11, the information on the infrared communication scheme is retrieved in step a2 by the communication port controller 12 from the relating information table 24. In step a3, the communication port controller 12 sends the information on the infrared protocol of the selected infrared communication scheme to the infrared protocol selector 13. In step a4, the information on the infrared modulation/demodulation scheme of the selected infrared communication scheme is sent from the communication port controller 12 to the infrared modulation/demodulation scheme selector 18. In step a5, the operation of the communication port controller 12 is completed.

Figure 4:
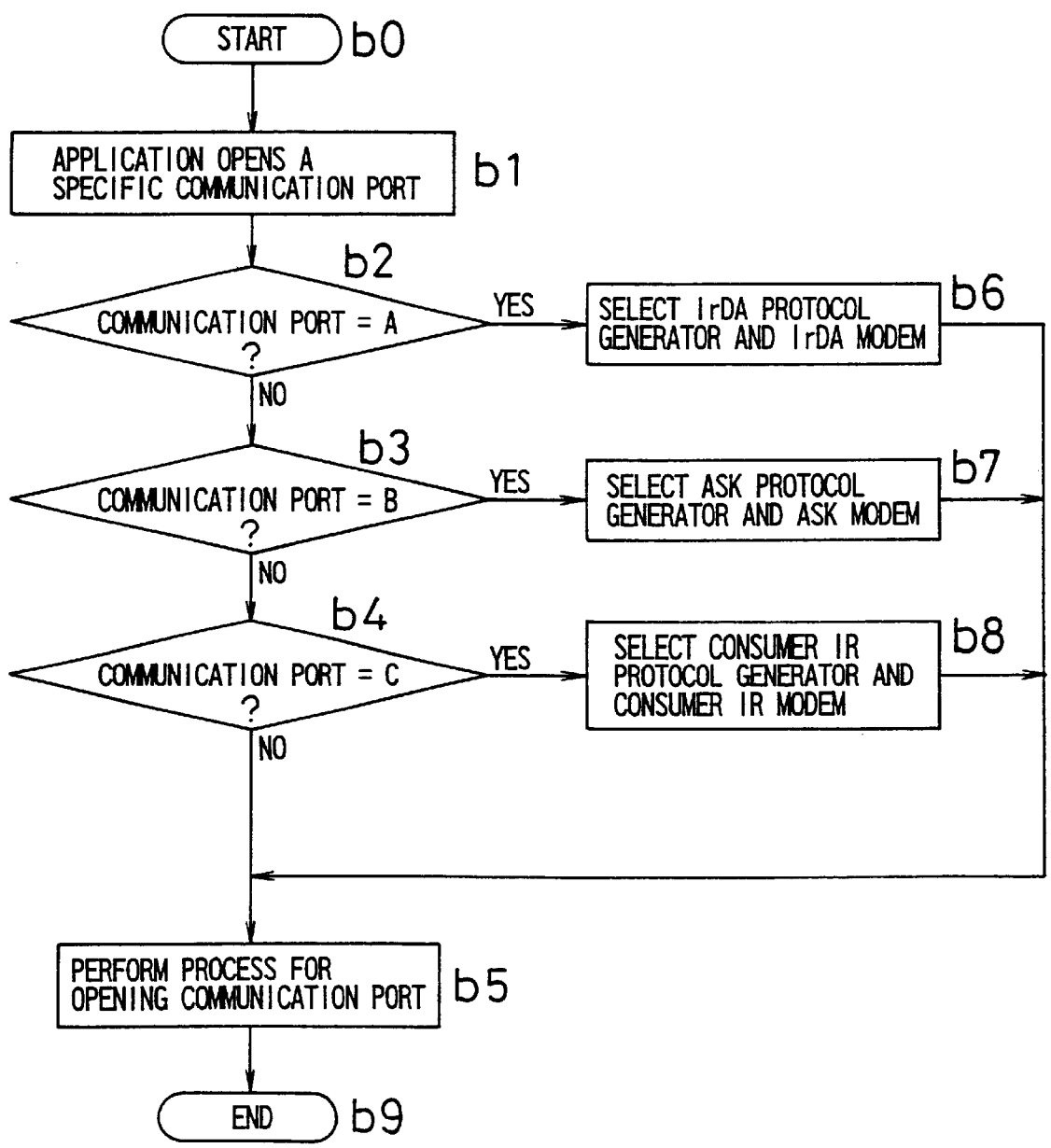
FIG. 4 is a flowchart showing an operation of selecting an infrared communication scheme by the infrared communication control apparatus 10 of FIG. 1.

FIG. 4, corresponding to step a1 in FIG. 3, shows an operation performed when the application program opens a communication port 11 related to the infrared communication scheme. The operation starts with step b0, followed by step b1 in which the application program opens one specific communication port 11. In step b2, the communication port controller 12 judges whether the communication port 11A is opened or not. In a case where it is judged that the communication port 11A is not opened, it is judged in step b3 whether the communication port 11B is opened or not. In a case where it is judged that the communication port 11B is not opened, it is judged in step b4 whether the communication port 11C is opened or not. In a case where it is judged that the communication port 11C is not opened, it is judged that a communication port for other than infrared communication is opened, and a process for opening a communication port is performed in step b5. When it is judged in steps b2, b3 or b4 that the communication port 11A, 11B or 11C is opened, respectively, the related infrared communication scheme is selected in step b6, b7 or b8. In step b6, the IrDA protocol generator 14 and the IrDA modem 19 are selected. In step b7, the ASK protocol generator 15 and the ASK modem 20 are selected. In step b8, the consumer IR protocol generator 16 and the consumer IR modem 21 are selected. Even after the infrared communication scheme is selected in steps b6, b7 and b8, the process for opening a communication port is performed in step b5. The selection in steps b6, b7 and b8 remains effective until the opened communication ports 11A, 11B and 11C are closed. Upon completing the process for opening the communication port in step b5, the operation is terminated in step b9.

Figure 5:
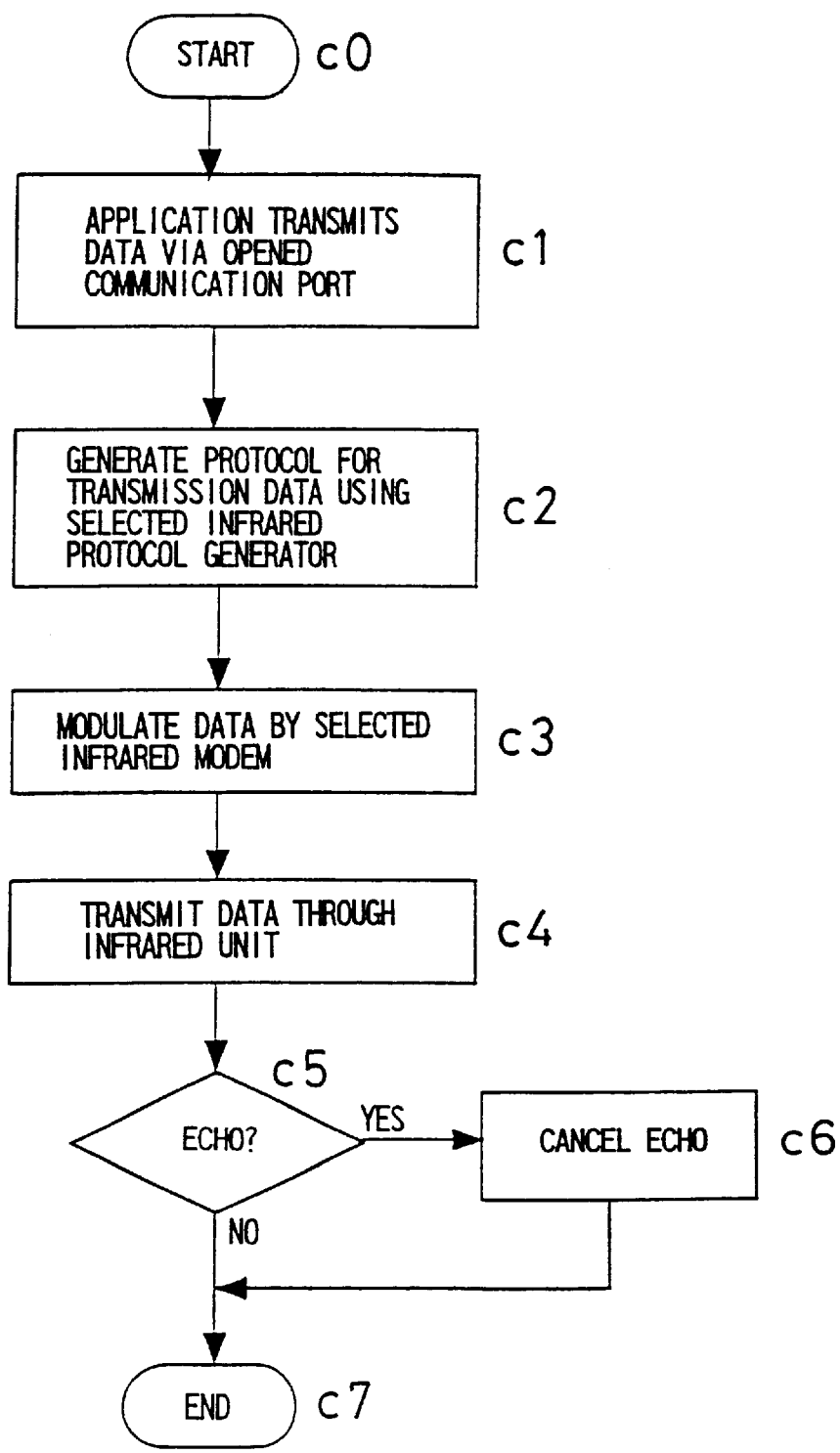
FIG. 5 is a flowchart showing an operation of transmitting infrared signals by the infrared communication control apparatus 10 of FIG. 1.

FIG. 5 shows an operation of transmitting data by the application program through the opened communication port 11. The operation starts with step c0. In step c1, the application program transmits data to the opened communication port 11. In step c2, a protocol for data transmission is generated by using the selected infrared protocol generator. In step c3, the protocol thus generated is supplied to the selected infrared modem and the data is modulated. In step c4, the modulated data is transmitted from the infrared unit 23. In step c5, the echo characteristic of the infrared signals is checked, and when an echo exists, it is canceled in step c6. When an echo does not exist in step c5 or when the echo is canceled in step c6, the operation is terminated in step c7. In the infrared unit, such an echo may occur as the transmitted data is jumped back and received due to the characteristic of the infrared rays. The echo cancellation is a process to eliminate the echo data.

Figure 6:
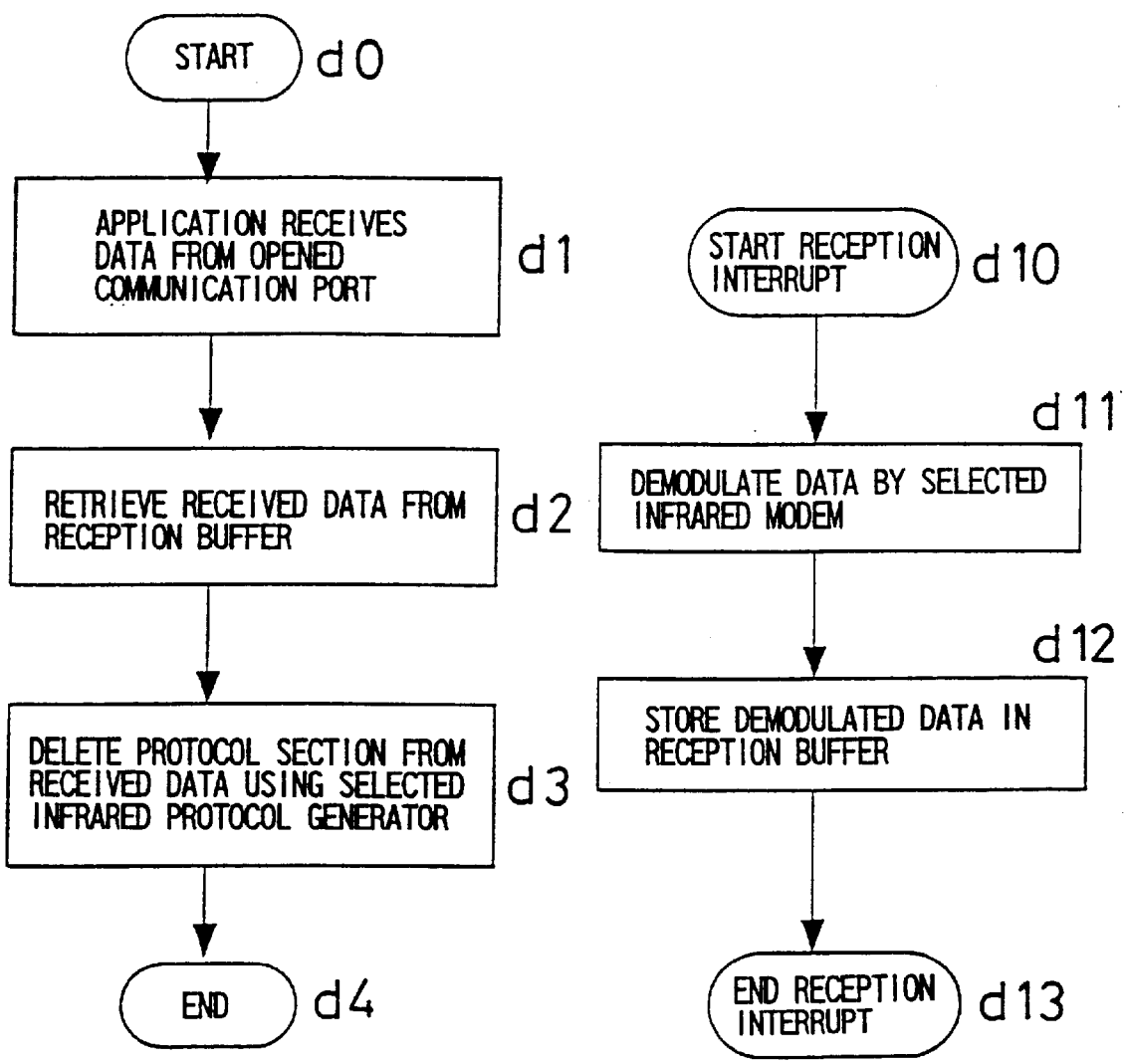
FIG. 6 is a flowchart showing an operation of receiving infrared signals by the infrared communication control apparatus 10 of FIG. 1.

FIG. 6 shows an operation of receiving data by the application program through the opened communication port 11. The operation starts with step d0. In step d1, the application program receives data from the opened communication port 11. In step d2, the received data is retrieved from the reception buffer 25. In step d3, a protocol section is deleted from the received data by using the infrared protocol generator selected when the communication port 11 is opened. The data from which the protocol section is deleted constitute data which can be interpreted by the application program. The reception buffer 25, which is secured in the memory 26, stores the received data by processing an interrupt for reception. Upon receiving infrared signals 27 by the infrared unit 23, an interrupt signal for reception is generated, and the communication port controller 12 handles the interrupt. The reception interrupt process is started with step d10. In step d11, the data is demodulated by the selected infrared modem. In step d12, the demodulated data is stored in the reception buffer 25, followed by step d13 where the interrupt process for reception is completed and the process returns to what is executed when the interrupt process is generated.

Figure 7:
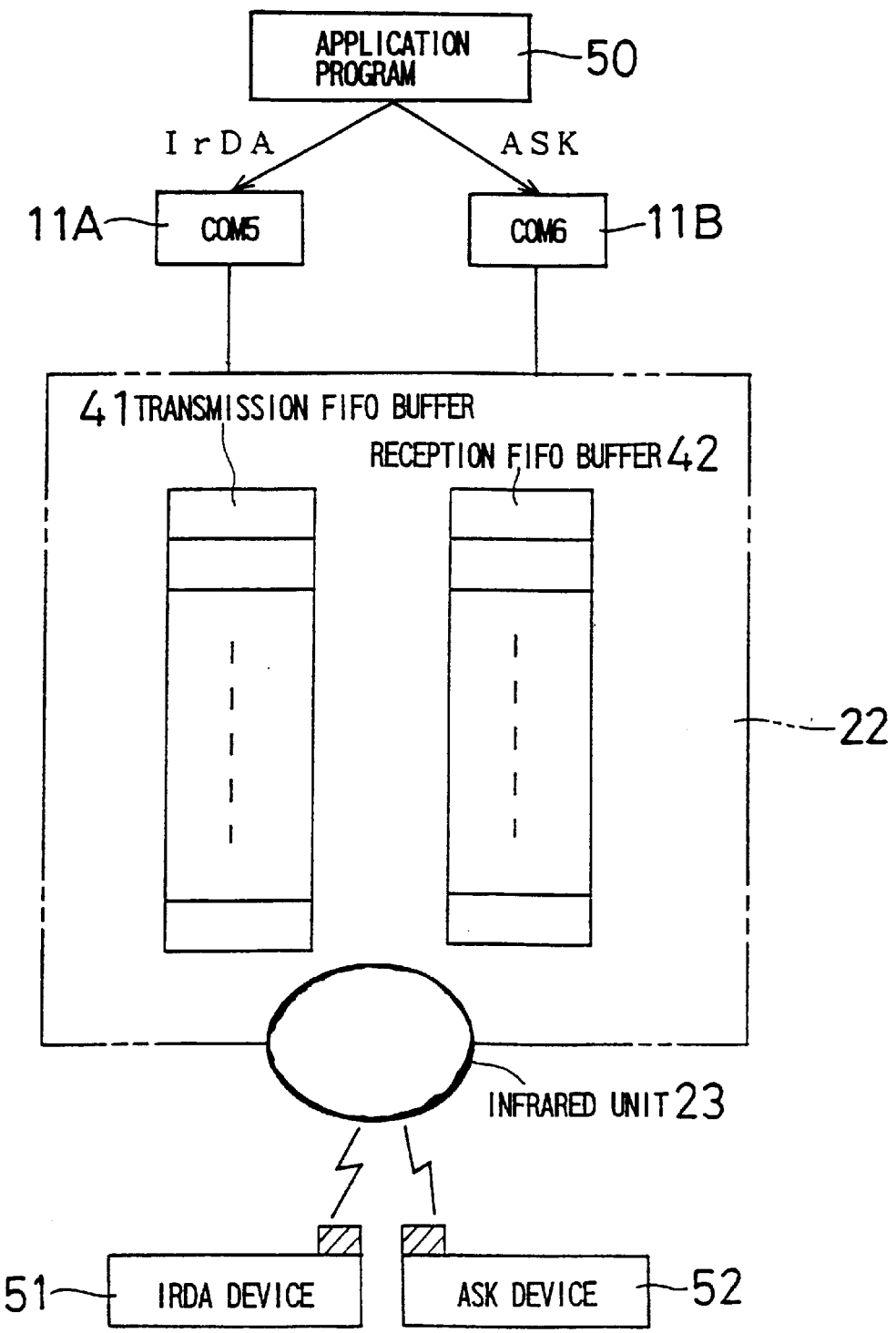
FIG. 7 is a block diagram showing a state where the infrared communication is conducted in a plurality of schemes according to the embodiment of FIG. 1.

FIG. 7 shows a configuration in infrared communication using the infrared controller 22. The infrared controller 22 includes a transmission FIFO (first-in first-out) buffer 41 for temporarily storing the data transmitted through the communication port 11, and a reception FIFO buffer 42 for temporarily storing the infrared data received from the infrared unit 23. The FIFO buffers 41 and 42 operate to output the data on first-in first-out basis. The received data can be stored to some extent in the reception FIFO buffer 42, and therefore the infrared signals 27 can be received even before the interrupt process for reception shown in FIG. 6 begins. Due to the physical characteristic of infrared rays, when the data stored in the transmission FIFO buffer 41 is transmitted sequentially through the infrared unit 23 as infrared rays, the data may be received by the infrared unit 23 and stored in the reception FIFO buffer 42 as an echo at the same time.

Figure 8:
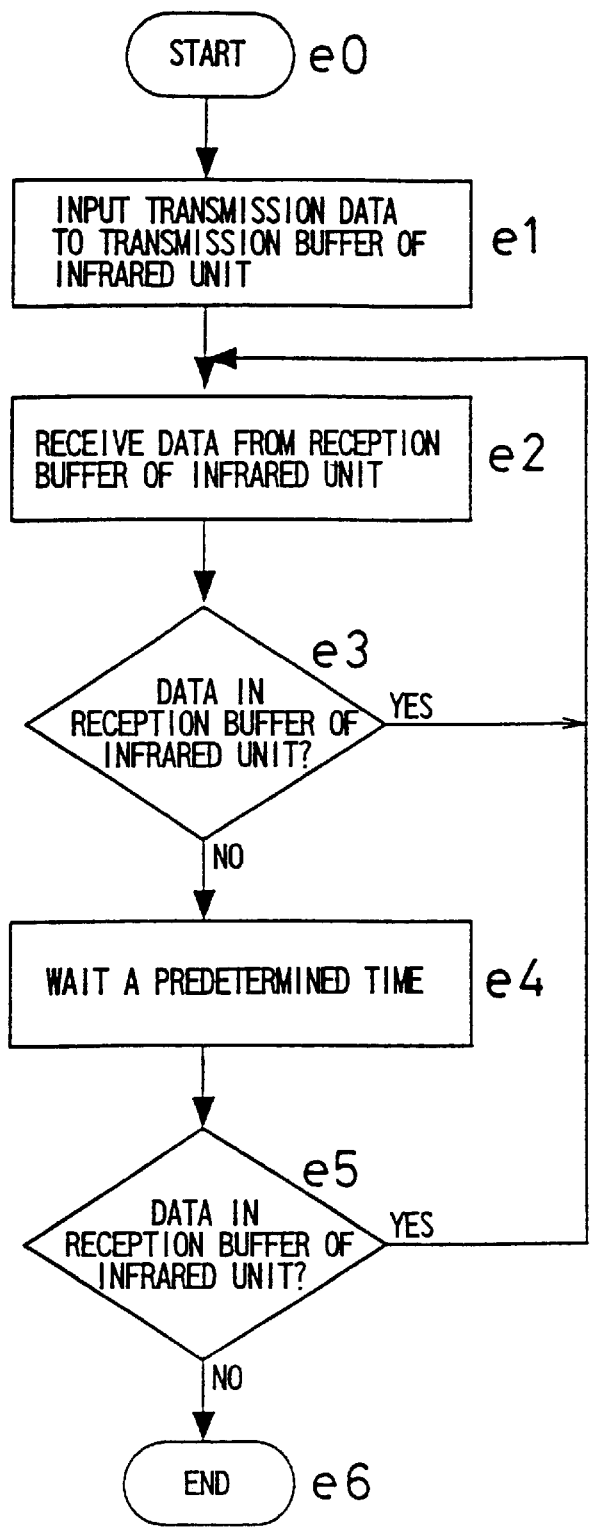
FIG. 8 is a flowchart showing an echo canceling operation by the infrared communication control apparatus 10 of FIG. 1.

FIG. 8 shows an operation of canceling the echo. The operation starts with step e0. In step e1, the transmission data is input to the transmission FIFO buffer 41 for transmitting the data from the infrared unit 23. As soon as the data enters the transmission FIFO buffer 41, the data is retrieved from the reception FIFO buffer 42 in step e2. In step e3, it is judged whether data remains in the reception FIFO buffer 42 of the infrared unit 23. In a case where data remains, the process returns to step e2. This operation is repeated until the data is completely removed from the reception FIFO buffer 42. Then, after a predetermined length of time elapses in step e4, it is checked again whether data remains in the reception FIFO buffer 42 in step e5. The absence of data is regarded as a completion of cancellation, and the operation ends in step e6. In a case where data remains in step e5, the process returns to step e2 so as to continue the echo cancellation process again.

Figure 9:
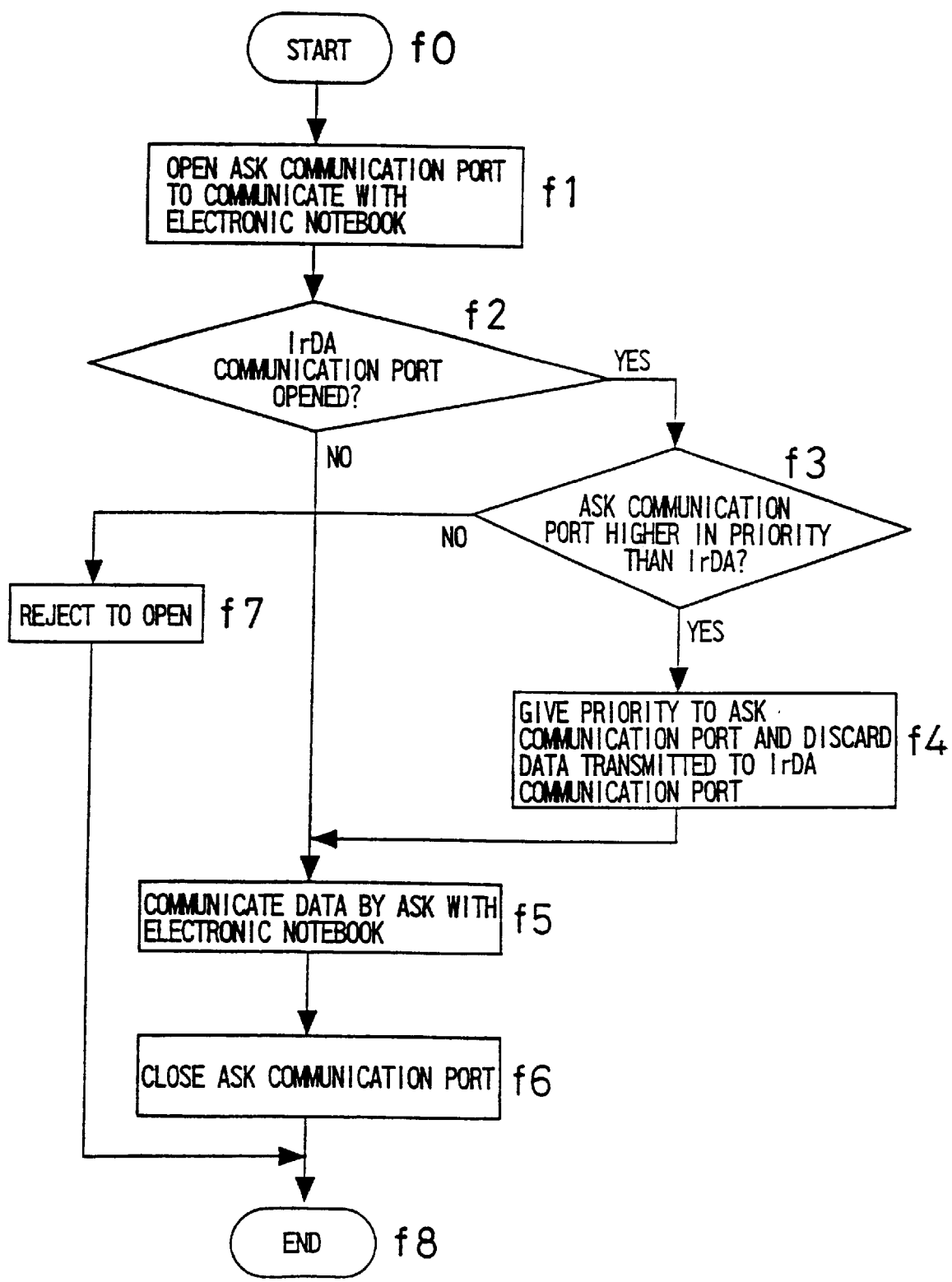
FIG. 9 is a flowchart showing an priority processing operation by the infrared communication control apparatus 10 of FIG. 1.
Figure 10:
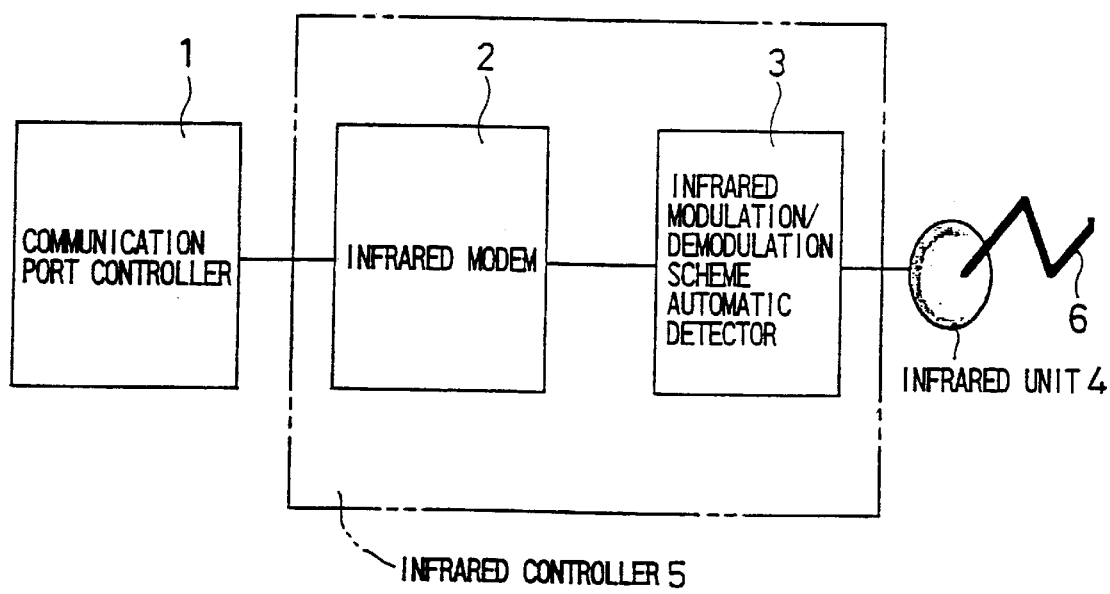
FIG. 10 is a schematic block diagram showing a conventional configuration in a simplistic fashion.

FIG. 9 shows a process for sharing the infrared unit 23 in a case where a plurality of communication ports 11 are opened at the same time. As a prerequisite for this process, according to the IrDA scheme, an application program called an infrared monitor is required to be kept in operation in order to find an infrared unit which is available for communication. As shown in FIG. 7, the infrared monitor of the application program 50 opens the communication port 11A related to IrDA as COM5 and transmits a proper protocol data to the communication port 11A thereby to monitor an IrDA device 51, which is an IrDA infrared unit constituting the other party. In this process, the infrared communication control apparatus 10 is in a state where the IrDA infrared protocol generator 14 and the IrDA modem 19 are selected. This step f0 is followed by step f1 in which a program other than the application program 50 opens the communication port 11B related to the ASK as COM6 to communicate with an ASK device 52 such as an electronic notebook. In step f2, it is judged whether the IrDA communication port 11A is opened or not. As a prerequisite for this process, since the IrDA device is monitored, the process proceeds to step f3, where it is judged whether the ASK communication port 11B is higher in priority than the IrDA communication port 11A. The communication port 11B related to the ASK is higher in priority than the communication port 11A related to the IrDA. The process therefore proceeds to step f4, where the ASK communication port 11B is given priority, and all the data transmitted to the IrDA communication port 11A is discarded. When it is judged in step f2 that the communication port 11A is not opened and when the process of step f4 is completed, data communication with the electronic notebook using the ASK infrared communication scheme is conducted in step f5. Upon completing data communication, the ASK communication port 11B is closed in step f6. In a case where it is judged in step f3 that the ASK communication port 11B is lower in priority than the IrDA communication port 11A, it is rejected to open in step f7. Upon completing step f6 or step f7, the operation ends with step f8, thereby automatically returning to the original state.

In FIG. 7, a case is assumed where the infrared communication control apparatus 10 of FIG. 1 is mounted on the personal computer having at least the UART unit, the infrared controller 22 and the infrared unit 23. When data is transmitted from this personal computer to the ASK device 52 such as an electronic notebook supporting the ASK scheme, IrDA and ASK are switched to each other through the communication port 11B emulating a serial interface. Assume that the communication port of IrDA scheme is COM5 and the communication port of ASK scheme is COM6 on the personal computer, and that COM5 is higher in priority than COM6. Usually, in communication with an IrDA communication equipment, a protocol for finding the other party is required to be constantly output from the infrared unit of the personal computer according to the IrDA modulation scheme. This is equivalent to say that the port of COM5 constantly occupies the infrared unit 23 of the personal computer. In order to conduct data communication by the ASK scheme with an electronic notebook or the like under this condition, the COM6 is opened and data communication is conducted through the COM6. In this way, data communication according to ASK scheme can be performed. This is because that COM6 is higher in priority than COM5 and therefore the infrared unit 23 occupied by COM5 is transferred provisionally to COM6 when COM6 is opened. When COM6 is closed, the right to occupy the infrared unit 23 is returned to COM5.

Any combination of the infrared communication schemes can be employed among the IrDA scheme, the ASK scheme and the consumer IR scheme. Furthermore, other schemes can be added thereto.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An infrared communication control apparatus comprising:
   a plurality of communications ports, each said communication port having an open configuration and a closed configuration, and being respectively related to a plurality of infrared communications schemes;
   selecting means for selecting, prior to the operation of said apparatus to receive and/or transmit data when at least one of the plurality of communications ports is in its open configuration, a protocol and modulation/demodulation scheme of a selected one of the infrared communication schemes related to the at least one communication port to be opened;
   protocol generating means for generating data conforming to the protocol selected by the selecting means; and
   infrared modulation/demodulation means for modulating the data generated by the protocol generating means in accordance with the modulation/demodulation scheme selected by the selecting means to generate and transmit infrared signals, and for demodulating received infrared signals into data.

2. The infrared communication control apparatus of claim 1, wherein among the communication ports is included a communication port having an interface for mutual communication of multi-purpose data between a computer system and a peripheral unit or between computer systems, the communication port emulating a serial interface for continuously transmitting/receiving data.

3. The infrared communication control apparatus of claim 1, wherein among the communication ports is included a communication port having an interface for mutually communicating multi-purpose data between a computer system and a peripheral unit or between computer systems, the communication port emulating a parallel interface for continuously transmitting/receiving data.

4. The infrared communication control apparatus of claim 1, further comprising storing means for storing a relation between the infrared communication scheme and the communication port in the form of an information table.

5. The infrared communication control apparatus of claim 1, wherein an IrDA scheme is included among the infrared communication schemes.

6. The infrared communication control apparatus of claim 1, wherein an ASK scheme Is included among the infrared communication schemes.

7. The infrared communication control apparatus of claim 1, wherein a consumer IR scheme is included among the infrared communication schemes.

8. The infrared communication control apparatus of claim 1, further comprising echo canceling means for canceling received data after data is transmitted from the infrared modulation/demodulation means.

9. A method for controlling an infrared communication, comprising the steps of:
   relating a plurality of infrared communication schemes to a plurality of communication ports in advance, respectively, and accessing each of the communication ports to automatically select and switch a protocol and a modulation/demodulation scheme of an infrared communication scheme related to the communication port.

10. An infrared communication control apparatus comprising:
    a plurality of communications ports respectively related to a plurality of infrared communications schemes;
    selecting means for selecting, when one of the plurality of communications ports is open, a protocol and modulation/demodulation scheme of the infrared communication scheme related to the one communication port to be opened;
    protocol generating means for generating data conforming to the protocol selected by the selecting means; and
    infrared modulation/demodulation means for modulating the data generated by the protocol generating means in accordance with the modulation/demodulation scheme selected by the selecting means to generate and transmit infrared signals, and for demodulating received infrared signals into data;
    wherein said infrared communication control apparatus further comprises priority processing means for controlling the selecting means so as to select a communication port in accordance with a predetermined order of priority when a plurality of the communications ports are to be opened at the same time.

11. The infrared communication control apparatus of claim 10, wherein among the communication ports is included a communication port having an interface for mutual communication of multi-purpose data between a computer system and a peripheral unit or between computer systems, the communication port emulating a serial interface for transmitting/receiving data.

12. The infrared communication apparatus of claim 10, wherein among the communication ports is included a communication port having an interface for mutually communicating multi-purpose data between a computer system and a peripheral unit or between computer systems, the communication port emulating a parallel interface for continuously transmitting/receiving data.

13. The infrared communication control apparatus of claim 10, further comprising storing means for storing a relationship between the infrared communication scheme and the communication port in the form of an information table.

14. The infrared communication apparatus of claim 10, wherein an IrDA scheme is included among the infrared communication schemes.

15. The infrared communication control apparatus of claim 10, wherein an ASK scheme is included among the communication schemes.

16. The infrared communication control apparatus of claim 10, wherein a consumer IR scheme is included among the infrared communication schemes.

17. The infrared communication control apparatus of claim 10, further comprising echo canceling means for canceling received data after data is transmitted from the infrared modulation/demodulation means.

* * * * *